(No Model.) 2 Sheets—Sheet 1.
M. J. WIGHTMAN.
REGULATING APPARATUS FOR ELECTRIC MOTORS.
No. 444,900. Patented Jan. 20, 1891.

WITNESSES

INVENTOR
MERLE J. WIGHTMAN

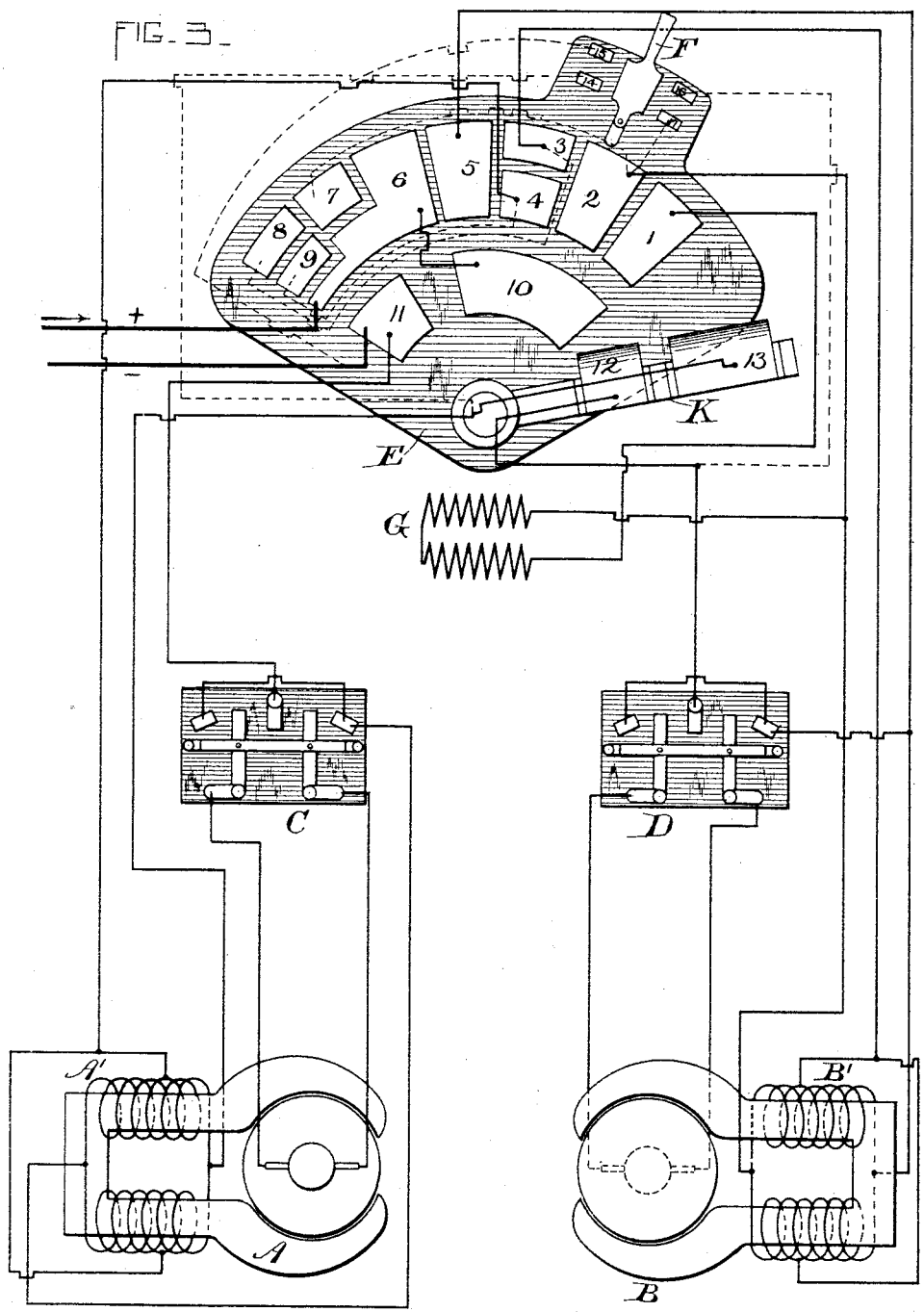

UNITED STATES PATENT OFFICE.

MERLE J. WIGHTMAN, OF SCRANTON, PENNSYLVANIA, ASSIGNOR TO THE THOMSON-HOUSTON ELECTRIC COMPANY, OF CONNECTICUT.

REGULATING APPARATUS FOR ELECTRIC MOTORS.

SPECIFICATION forming part of Letters Patent No. 444,900, dated January 20, 1891.

Application filed September 19, 1890. Serial No. 365,681. (No model.)

*To all whom it may concern:*

Be it known that I, MERLE J. WIGHTMAN, a citizen of the United States, residing at Scranton, county of Lackawanna, and State of Pennsylvania, have invented certain new and useful Improvements in Regulating Apparatus for Electric Motors, of which the following is a specification.

My invention relates to an apparatus for carrying into effect a process of motor-regulation shown and described in my application for patent, Serial No. 323,365, filed February 17, 1890, upon which a patent was issued on the 9th day of September, 1890. The said process relates to the regulation of electrically-propelled mechanism wherein two or more motors are mechanically connected to the said mechanism and its speed varied by connecting the two motors either in series or multiple arc, and by further varying the field-magnet strength of the motors in their different connections.

My present invention consists in a switch by which a single operating-lever is used to make all the necessary connections for coupling the motors in various ways and for regulating them when so coupled.

My invention is illustrated in the accompanying drawings, in which—

Figure 1:
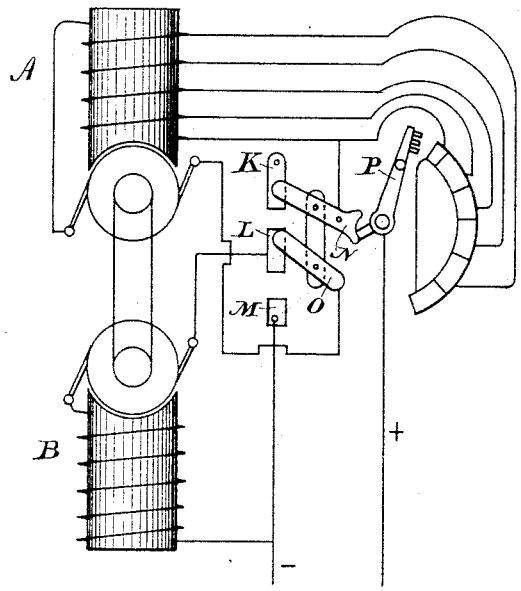
Figure 2:
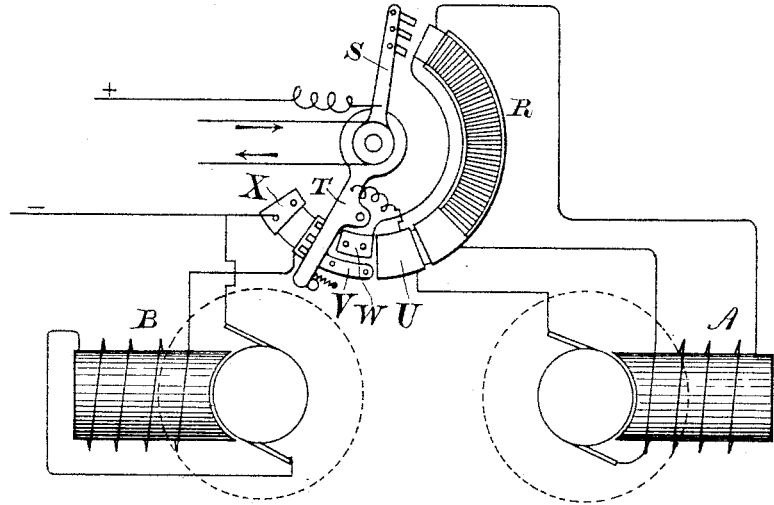

Figures 1 and 2 show diagrammatically the connection, and Fig. 3 shows, in diagram, two motors with their various connections and a switch which may be operated to effect various changes in the motor-connection.

In Fig. 1, A and B are two electric motors, understood to be geared to the same mechanism. These motors are provided with a regulating or controlling switch, which consists of a series of contact-points connected to the motor-terminals, and suitable switch-arms, also of a field-magnet regulator, all adapted to be operated by a single lever P, so that the motors may be changed from series to multiple arc by means of the contact-points and switch-arms, and the field-magnet be regulated by reducing the potential of one of the motors to such a point that it may readily be short-circuited before being removed from the series circuit. In this switch, L and M are two contact-plates connected to the terminals of motor B, and K is a similar plate, which is out of circuit. O and N are two pivoted switch-arms, adapted to rest either on K and L or upon L and M, respectively. P is a lever, adapted to pass over a series of contact-plates connected to successive points of the magnet-coils of motor A, so as to regulate the said magnet, and at the same time in its extreme position it acts upon the switch-arms O and N to change them from one position to the other. In the position shown the motors are in series with full magnet strength, the circuit being as follows: positive terminal, lever P, arm N, motor A, arm O, plate L, and motor B to negative terminal. As P is turned it gradually throws out sections of the magnet-coils of motor A until the motor is entirely killed, so that it may be short-circuited in changing from series to multiple arc. As P moves onto last contact-plate, it shifts the arms N and O to plates L and M, respectively, and the motors will then be in multiple arc with full magnet strength. The circuit is then as follows: positive terminal, lever P, motor A, arm O, plate M, and negative terminal; also, positive terminal, lever P, arm N, plate L, motor B, and negative terminal.

In Fig. 2 substantially the same connections are made; but the regulator for the field-magnet consists of a resistance R, more or less of which is included in a short circuit about the magnet-coils, and thereby vary the magnetic strength. In this arrangement T is a switch-lever for changing the connections, and S is a contact-lever moving over resistance R to bring more or less of it into circuit. When motor A is substantially killed by means of resistance R being short-circuited, the switch-lever S strikes a pin upon lever T and the two are moved along together to alter the motor-connections from series to multiple arc. The first arrangement has the following circuit: positive terminal, lever S, motor A, plate U, lever T, plate V, motor B, and negative terminal. After lever S has been brought around so that its contact rests upon the plates V and W, the circuit will then be as follows: positive terminal, lever S, plate W, motor A, plate U, lever T, and plate X to negative terminal; also, positive terminal, lever S, plate W, plate V, motor B, and negative terminal.

In practice many forms of my invention may be employed by which the desired results may be secured. The one which I have considered preferable is illustrated in Fig. 3. Referring to the said Fig. 3, A and B are the two motors, respectively, which are understood to be connected to a common load. A' and B' are their respective field-magnet coils, which are connected in multiple arc, and a wire taken off from an intermediate point in the coils, so that the strength of the field-magnet may be varied by having the whole or a part of the coils in circuit. C and D are the respective pole-changing switches for reversing the directions of the current in the armatures of the two motors, and thus changing their direction of motion. E is a switch-board having upon it a number of contact-plates arranged in two circular series, and provided with a pivoted lever K, having upon it two contact-springs 12 and 13, adapted to pass over the two series of contact-plates, respectively. G is a resistance-coil. F is a small switch-lever upon one corner of board E, which may be moved to connect either the two plates 14 and 15 or the two plates 16 and 17. The object of this is to throw out of circuit one or the other of the two motors in case of accident. Of the contact-plates on board E, 6 and 11 are connected, respectively, to the two terminals of the circuit, the former being considered in this specification as the positive or entering terminal and the latter as the negative or exit terminal. The arm K may be operated by hand, and as it is moved over the contacts the various connections hereinafter described are made. In general, the motors are first connected in series with full magnet strength for the lowest speed. The field-magnet of one is then cut out and the speed slightly increased. Next the whole of the field is cut out and the motor remains inactive, the work being accomplished by the opposite motor. The first motor is then connected in multiple arc or parallel circuit with the second, and, lastly, the field-magnet strength of both motors is varied to obtain the last degree of speed. In position of the arm K as shown in the drawings the circuit is open, and the first movement of the arm brings the contact-springs 12 and 13 in contact, respectively, with plates 10 and 1. This gives us what we will term "condition $a$." Condition $a$ circuit as follows: positive terminal, plate 6, plate 10, spring 12, reverse switch D, armature, field-magnet B', resistance G, plate 1, spring 13, field-magnet A', reverse-switch C, armature, and plate 11 to negative terminal. Both motors are in series with full magnet strength, and the two reverse-switches are shown in the drawings with both terminals disconnected, and it will be understood that they will be set in one direction or the other, and that the current will pass from the switch to the armature of its respective motor, thence back to the switch, and on to the next point of the circuit. When the arm K is moved still farther, the springs 12 and 13 are in contact, respectively, with the plates 10 and 2. We then have "condition $b$." Condition $b$ circuit as follows: positive terminal, plate 6, plate 10, spring 12, reverse-switch D, armature, field-magnet B', plate 2, spring 13, field-magnet A', reverse-switch C, plate 11, and negative terminal. In this condition the resistance G is short-circuited. K is then moved forward until the springs 12 and 13 rest, respectively, on plate 10 and plates 3 and 4. This gives us "condition $c$." Condition $c$ circuit as follows: positive terminal, plate 6, plate 10, spring 12, reverse-switch D, armature, field-magnet B', intermediate wire 18, plate 3, spring 13, plate 4, intermediate wire 19, field-magnet A', reverse-switch C, armature, plate 11, and negative terminal. In this condition part of the field-magnet coils of both machines are out of circuit. K is then moved still farther till 12 and 13, rest, respectively, on 10 and 5. We then have "condition $d$." Condition $d$ circuit as follows: positive terminal, plate 6, plate 10, spring 12, reverse-switch D, armature, plate 5, spring 13, and through motor A to negative terminal. This condition cuts out entirely field-magnet coil B, and only one motor is actively employed. The next movement of K brings spring 13 onto plate 6 and spring 12 onto a blank, which gives us "condition $e$." Condition $e$ circuit as follows: positive terminal, plate 6, spring 13, through motor A, and plate 11 to negative terminal. At this point motor B is entirely out of circuit. The next position of K brings spring 12 on plate 11 and spring 13 on plates 6 and 7, and we have "condition $f$." Condition $f$ circuit as follows: positive terminal, plate 6, spring 13, and through motor A to negative terminal, and also from spring 13 to plate 7, plate 2, through motor B, spring 12, and plate 11 to negative terminal. The two motors are then in multiple arc with full magnet strength. The last movement of K brings spring 12 on plate 11 and spring 13 on plates 6, 8, and 9, and we have "condition $g$." Condition $g$ circuit as follows: positive terminal, plate 6, spring 13, plate 9, plate 4, intermediate wire 19, through motor A, and plate 11 to negative terminal, and also positive terminal, plate 6, spring 13, plate 8, plate 3, intermediate wire 18, through motor B to spring 12, and plate 11 to negative terminal. In this position the two motors are in multiple arc with their field-magnet coils partly out of circuit, so that the speed will be at a maximum. When it is found that one motor is disabled, it can be thrown out by moving the lever F to one side or the other, so as to connect either plates 14 and 15 or the plates 16 and 17. The former plates are connected, respectively, to the spring 13 and the plate 11, which are the two terminals of motor A. The latter pair are connected, respectively, to plates 2 and the spring 12, which are the terminals of motor B. When, therefore, the switch F is turned upon the first pair of contacts, motor A will be short-circuited. Whichever motor may be cut out the remaining motor will propel the mechanism having the two rates of speed given by full magnet strength and half magnet strength, which will be sufficient in the case of a railway-motor to bring a disabled car or train to the station.

In the apparatus which I have described an electrically-propelled machine on a constant potential circuit could have its speed regulated at will without interposition of resistances, and a switch such as I have described can be readily located at the point at which it is desired to control the machine, and no mechanical connections are necessary. The resistance G makes an additional regulating step when both motors are in series, the first action of the switch being to cut this out of circuit. The principal function of this, however, is simply to prevent a too great initial flow of current when the circuit is closed, though it may be increased, so as to become a means of adjusting the speed to any desired degree.

What I claim as new, and desire to secure by Letters Patent, is—

1. The combination, with two electric motors geared to the same mechanism, of a controlling-switch having contacts connected to the terminals of both motors, respectively, and to the line-terminals, and provided with a field-magnet regulator for one or both of the motors, whereby the said switch may be used to vary the speed of the mechanism by changing the field-magnet strength and shifting the motors from series to multiple arc.

2. The combination, with two electric motors geared to the same mechanism, of a controlling-switch having contacts connected to the terminals of both motors, respectively, and to the two line-terminals, and provided with a field-magnet regulator for one or both of the motors, a single operating-handle being connected to the moving parts for the contacts and the regulator, whereby a single movement of the switch may be employed to vary the speed of the mechanism by changing the field-magnet strength and shifting the motors from series to multiple arc.

3. The combination, with two electric motors geared to the same mechanism, of a controlling-switch having contacts connected, first, to the terminals of both motors, respectively; second, to the two line-terminals, and, third, to one or more intermediate points in the field-magnet coils of one or both motors, and a common contact-lever passing over the said contacts and successively regulating the field-magnet strength and shifting the motors from series to multiple-arc connection, whereby the said switch may be used to vary the speed of the mechanism by effecting the said changes of connection.

4. The combination, with two electric motors geared to the same mechanism, of a controlling-switch for changing the motors from series to multiple-arc connections and a cut-out switch for each of the said motors, whereby the speed of the said mechanism may be varied by changes in the motor connection and either of said motors removed from circuit at will.

5. The combination, with two electric motors geared to the same mechanism, of a regulating-switch consisting of contact-plates connected to the motor-terminals and the line-terminals and a movable piece bearing thereon acting to shift the motors from series to multiple arc, of a resistance and a contact-plate connected therewith, so that it may be put into and out of circuit at will to give an additional degree of regulation.

MERLE J. WIGHTMAN.

Witnesses:
HERMAN BERGHOLTZ,
H. H. SIVELLY.